United States Patent Office 2,776,426
Patented Jan. 1, 1957

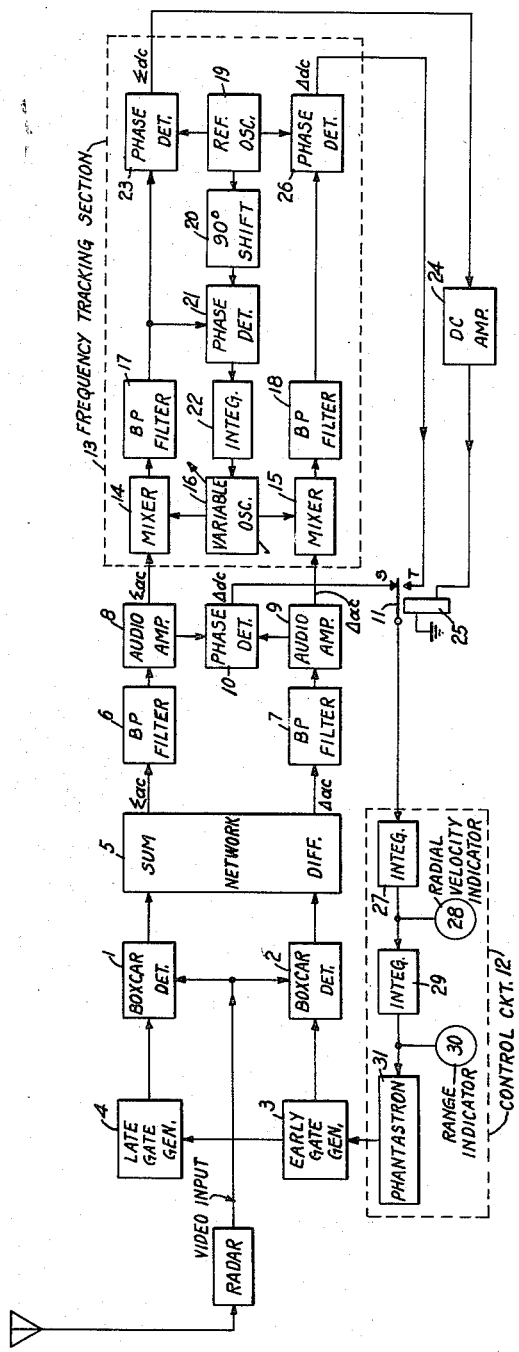

2,776,426

MOVING TARGET RANGE TRACKING UNIT

Frederick J. Altman, Ridgewood, N. J., assignor to International Telephone and Telegraph Corporation, a corporation of Maryland Application November 3, 1952, Serial No. 318,503

18 Claims. (Cl. 343—9)

This invention relates to moving target range tracking units for use in conjunction with moving target indicator radar systems.

The use of automatic time measurement systems to provide for the automatic range tracking of a moving target when used with radar systems has, in the past, resulted in inferior performance because the radar system echo signals often faded into thermal noise, obliterating the target signal causing failure of the automatic tracking unit. Furthermore, undesired signals from fixed targets or moving targets other than the desired one have demanded from the tracking circuitry either human or automatic discrimination, alertness, and judgment. However, it has been recognized that the rapidity of response and the higher accuracy characteristics of automatic range tracking controls are of extreme value, especially for high accuracy radars, and that automatic range tracking is far less fatiguing for the operator, particularly when high accuracies are demanded over long periods of operation. In addition, automatic electronic tracking and searching has a distinct weight advantage over mechanical means for tracking and searching.

One of the objects of this invention, therefore, is to provide a moving target range tracking unit for use with a coherent radar system which will, after manual acquisition, automatically track airplanes above a minimum radial velocity, providing meter indications of range, velocity, and Doppler frequency.

Another object of this invention is to provide a moving target range tracking unit which will, after manual acquisition, provide an output voltage proportional to the range which is unaffected by the presence of clutter or other targets moving at appreciably different radial velocities.

According to a feature of this invention, a moving target indicator radar system provides a coherent video frequency signal input to the moving target range tracking unit. The input signal is divided into two equal periods by time selection or gating means. The Doppler frequency envelopes of the signal during each of the two periods is detected, and an automatically tuned wave analyzer circuit provides D.-C. sum and difference outputs from the comparison of the desired signal component contained in each period. The D.-C. difference signal is operated upon to convert it into a form suitable for controlling the time selection apparatus.

According to another feature of this invention, the detected Doppler frequency signals are filtered to eliminate any clutter frequencies present, and through the use of a variable frequency oscillator, a signal is obtained from the detected signals which eliminates the signals due to any moving targets traveling at a radial velocity different from that of the desired signal.

The above-mentioned and other features and objects of this invention will become more apparent by reference to the following description taken in conjunction with the accompanying drawing, in which the figure is a schematic diagram in block form of one embodiment of this invention for use in conjunction with a moving target indicator type radar. The blocks of the drawing indicate circuits known to those skilled in the art.

Referring to the figure of the drawing, the coherent video frequency output of a moving target indicator type radar is coupled to the boxcar or clamped gate detectors 1 and 2. The video frequency input contains signals due to echoes of fixed targets or ground clutter and signals having Doppler frequency envelope waves, or in other words, signals due to moving targets. A time selection circuit, comprising an early gate generator 3 and a late gate generator 4, divides the input signal into two time periods. The boxcar or gated clamped detectors 1 and 2 detect the low frequency envelope waves of the input signals and maintain the peak signal output until the next gating period as determined by circuits 3 and 4. Thus the output of detectors 1 and 2 comprises D.-C. or low frequency signals due to clutter and the Doppler frequencies of the portion of the echoes due to moving targets during each of the gating periods. The outputs of each of the detectors 1 and 2 are coupled to network circuitry 5 where A.-C. signals proportional to the sum and difference of the two signals from detectors 1 and 2 are obtained. The A.-C. sum and A.-C. difference signals from network 5 are passed through band pass filters 6 and 7, respectively, which effectively discriminate against all low frequency signals due to ground clutter or fixed target echoes and also eliminating the video carrier and harmonics of the pulse rate of the coherent radar system. The filtered A.-C. sum and difference are amplified in audio amplifiers 8 and 9. The amplifiers' output contain all A.-C. frequencies due to echoes from all moving targets inside the gating period, both the desired moving target and undesired moving targets. The amplified A.-C. sum and difference signals from amplifiers 8 and 9 are compared in a phase detector 10 whose output is a D.-C. voltage of a magnitude and sense dependent upon the magnitude and phase of the A.-C. difference signals. This D.-C. voltage output is responsive to Doppler frequencies of all moving target echoes received during the gating period by the coherent radar system and to noise of a substantial frequency bandwidth and thus may be designated a broad band D.-C. control voltage and utilized during a search period to assist in the acquisition of the desired moving target echo signal by coupling the control voltage through a switch 11 to control circuit 12 which produces a trigger pulse to initiate the gating periods of the early and late gate generators 1 and 2.

The amplified A.-C. sum and difference signal outputs from amplifiers 8 and 9 are coupled to a frequency tracking section 13. The A.-C. sum and difference signal input to section 13 is coupled to sum and difference mixer circuits 14 and 15 where the signals are combined with the output of a variable frequency oscillator 16. Variable frequency oscillator 16 is automatically adjusted, as hereinafter explained, to provide in the outputs of mixers 14 and 15 signals which are proportional in amplitude and phase to the input A.-C. sum and difference signals from amplifiers 8 and 9 but at a predetermined frequency. The outputs of the mixers 14 and 15 are passed through band pass filters 17 and 18 which filter out all frequencies different from the predetermined frequency, thus discriminating against all signal inputs to mixers 14 and 15 due to interfering targets moving at radial velocities appreciably different from that of the desired target. A reference oscillator 19 provides a reference signal output at the predetermined frequency which has a 90° phase shift imparted to it by circuit 20. In phase detector 21 the shifted reference signal is compared with a portion of the output from filter 17 to obtain an error voltage when the output of filter 17 does not match the reference signal. This error voltage is operated on by integration circuit 22 whose output controls the variable frequency oscillator 16 to adjust its output signal and thereby to correct the output of the filter 17. Thus the comparison of the moving target A.-C. sum signal and the locally produced reference signal from oscillator 19 yields an error signal which is operated upon to correct it into a form suitable for controlling the variable frequency oscillator 16.

Phase detector 23 compares the output of filter 17 and the output of phase locked oscillator 19 to obtain a D.-C. sum signal voltage proportional in amplitude to the amplitude of the desired Doppler frequency component in the output of filter 17. This D.-C. sum signal voltage is coupled to D.-C. amplifier 24 whose output controls the coil 25 of a fade relay. Thus when the output of the D.-C. amplifier 24 is of a predetermined amplitude to indicate that the desired moving target signal is being properly tracked, fade relay coil 25 causes switch 11 to move from a search position S to a tracking position T. The output of the D.-C. amplifier 24 may be utilized to operate a "coast circuit" in a manner well known to those skilled in this art.

When switch 11 is in the tracking position T, the output of the phase detector 26, which compares the output of band pass filter 18 with the reference signal from phase locked oscillator 19, is coupled to control circuit 12. The output of detector 26 comprises a "narrow band" D.-C. voltage dependent in magnitude and sense upon the magnitude and phase of only the desired moving target Doppler frequency component in the A.-C. difference signal input to mixer 15. This D.-C. difference signal is indicative of the range error of the automatic tracking unit.

This D.-C. range error signal from phase detector 26 is coupled to a first integrator 27 of the control circuit 12. The output of the integrator circuit 27 is proportional to the radial velocity of the desired moving target and is coupled to meter 28 which is calibrated in velocity measurement units. The velocity signal output of integrator 27 is coupled to a second integration circuit 29 whose output is proportional to the range of the desired target from the point of acquisition. This range signal is displayed in indicator 30 coupled to the output of circuit 29. The range signal output of integrator 29 is coupled to phantastron circuit 31 whose output controls the time selection of early and late gate generators 3 and 4.

While I have described above the principles of my invention in connection with specific apparatus, it is to be clearly understood that this description is made only by way of example and not as a limitation to the scope of my invention as set forth in the objects thereof and in the accompanying claims.

I claim:

1. A moving target range tracking unit for use with a moving target indicator radar system having a coherent video frequency signal output comprising time selection means for dividing corresponding segments of said coherent video signal into two periods, means for detecting the Doppler frequency envelopes from the signal portion of each of said periods, means for comparing said Doppler frequency envelope components to provide sum and difference D.-C. outputs, whereby said sum output is indicative of desired signal strength and said difference output is indicative of the error in the periods of said time selection means, and means responsive to said difference output to control the periods of said time selection means to divide said coherent video signal into two periods of equal signal content, said means for detecting the Doppler frequency envelope including means for maintaining the peak output occurring during each of said periods until the succeeding period.

2. A moving target range tracking unit according to claim 1, wherein said time selection means includes first means for producing an early gate timing pulse and second means for producing a late gate timing pulse.

3. A moving target range tracking unit according to claim 1, which further includes means to integrate said D.-C. difference signal output to obtain a signal proportional to the radial velocity of said moving target.

4. A moving target range tracking unit according to claim 3, which further includes means to integrate said radial velocity signal to obtain a signal proportional to range of said moving target.

5. A moving target range tracking unit for use with a moving target indicator radar system having a coherent video signal output comprising time selection means for dividing corresponding segments of said coherent video signal into two periods, means for detecting the Doppler frequency envelopes from the signal portion of each of said periods, means for comparing said Doppler frequency envelope components to provide sum and difference D.-C. outputs whereby said sum D.-C. output is indicative of desired signal strength and said difference D.-C. output is indicative of the error in the periods of said time selection means, means responsive to said difference D.-C. output to control the periods of said time selection means to divide said coherent video signal into two periods of equal signal content, said means for comparing said Doppler frequency envelope components including means for producing A.-C. signals proportional to the sum and difference of said detected signals during each of said periods, a variable frequency oscillator, first means to mix the output of said variable frequency oscillator with said A.-C. signal, second means to mix the output of said variable frequency oscillator with said difference A.-C. signal, a reference oscillator, first means to compare the output of said reference oscillator with the output of said first mixer means and means under control of the output of said first comparison means to control the output of said variable frequency oscillator, and second means to compare the output of said reference oscillator with the output of said second mixer means to provide said difference D.-C. output.

6. A moving target range tracking unit according to claim 5, which further includes means to rectify the output of said first mixer means to provide said sum D.-C. output.

7. A moving target range tracking unit according to claim 5, which further includes third means to compare the phase of the output of said reference oscillator with the output of said first mixer means to provide said sum D.-C. output.

8. A moving target range tracking unit according to claim 5, which further includes means to filter said A.-C. sum and difference signals to eliminate undesired signals due to fixed targets.

9. A moving target range tracking unit according to claim 5, which further includes means to filter the output of said first and second mixer means to eliminate signals due to undesirable moving targets.

10. A moving target range tracking unit according to claim 5, wherein said means to control the output of said variable frequency oscillator includes means to integrate the output of said first comparison means.

11. A moving target range tracking unit according to claim 5, which further includes means to integrate said D.-C. difference signal to obtain a signal proportional to the radial velocity of said moving target.

12. A moving target range tracking unit according to claim 11, which further includes means to integrate said radial velocity signal to obtain a signal proportional to range of said moving target.

13. A moving target range tracking unit according to claim 1, wherein said means responsive to said difference D.-C. output includes a phantastron.

14. A moving target range tracking unit for use with a moving target indicator radar system having a coherent video frequency target signal output indicative of a moving target comprising means for producing an early gate timing pulse, means for producing a late gate timing pulse, means for detecting the Doppler frequency envelopes from said target signal during the time of each of said gate pulses, means for obtaining signals proportional to the sum and difference of the outputs of said detector means, means for filtering the outputs of said sum and difference, means to eliminate undesirable signals due to clutter, a variable frequency oscillator, first means for mixing the output of said variable frequency oscillator with said filtered sum signal to obtain a signal proportional in amplitude and phase to said sum signal but at a predetermined frequency, second means for mixing the output of said variable frequency oscillator with said filtered difference signal to obtain a signal proportional in amplitude and phase to said difference signal but at said predetermined frequency, first and second means to filter the output of said first and second mixing means, respectively, to discriminate against all signals at frequencies other than said predetermined frequency, a reference oscillator, first phase comparison means to compare the phase of said predetermined frequency output of said first filter means and the output of said reference oscillator, second phase comparison means to compare the phase of said predetermined frequency output of said second filter means and the output of said reference oscillator, means responsive to the output of said first comparison means to control said variable frequency oscillator, and means responsive to the output of said second phase comparison means to control said gate timing pulse producing means.

15. A moving target range tracking unit according to claim 14, which further includes third comparison means to compare the phase of the outputs of said first mixer means and said reference oscillator to obtain a D.-C. control voltage, means responsive to the output of said third phase comparison means to couple the output of said second comparison means to said gate timing pulse control means when the desired signal amplitude rises above a predetermined level.

16. A moving target search unit for use with a moving target indicator radar system having a coherent video frequency signal output comprising time selection means for dividing corresponding segments of said coherent video signal into two periods, means for detecting the Doppler frequency envelopes from the signal portion of each of said periods, means for comparing said Doppler frequency envelope components to provide sum and difference A.-C. outputs, means to detect the phase difference between said sum and difference A.-C. outputs to provide a D.-C. signal, and means responsive to said D.-C. signal to control the periods of said time selection means to divide said coherent video signal into two periods of equal signal strength.

17. A moving target search unit according to claim 16, which further includes means to filter said sum and difference A.-C. outputs whereby signal frequencies due to noise and clutter are eliminated.

18. A moving target search unit for use with a moving target indicator system having a coherent video signal output comprising time selection means for dividing corresponding segments of said coherent video signal into two periods, means for detecting the Doppler frequency envelopes from the signal portion of each of said period, means for comparing said Doppler frequency envelope components to provide sum and difference A.-C. outputs, means to detect the phase difference between said sum and difference A.-C. outputs to provide a D.-C. signal and means responsive to said D.-C. signal to control the periods of said time selection means to divide said coherent video signal into two periods of equal strength, a variable frequency oscillator, first means to mix the output of said variable frequency oscillator with said A.-C. sum output, second means to mix the output of said variable frequency oscillator with said A.-C. difference output, a reference oscillator, first means to compare the output of said reference oscillator with the output of said first mixer means and means under control of the output of said first comparison means to control the output of said variable frequency oscillator, second means to compare the phase of the output of said reference oscillator with the output of said first mixer means to provide a D.-C. sum output, third means to compare the output of said reference oscillator with the output of said second mixer means to provide a D.-C. difference output, means responsive to said D.-C. sum output to decouple said D.-C. signal from said time selection control means, and means responsive to said D.-C. sum output to couple said D.-C. difference signal to said time selection control means to divide said coherent video signal into two periods of equal signal content.

References Cited in the file of this patent

UNITED STATES PATENTS

| | | |
|---|---|---|
| 2,268,587 | Guanella | Jan. 6, 1942 |
| 2,433,667 | Hollingsworth | Dec. 30, 1947 |
| 2,515,464 | Minneman | July 18, 1950 |
| 2,600,193 | Bell et al. | June 10, 1952 |
| 2,631,279 | Bollinger et al. | Mar. 10, 1953 |
| 2,688,743 | Berger et al. | Sept. 7, 1954 |
| 2,717,377 | Tasker et al. | Sept. 6, 1955 |